United States Patent [19]

Thomas

[11] Patent Number: 5,065,349

[45] Date of Patent: Nov. 12, 1991

[54] METHOD FOR AND APPARATUS OF MONITORING HOW AN OPERATOR OPERATES A MACHINE

[75] Inventor: Bernard M. Thomas, St. Ismier, France

[73] Assignee: Mast-Air Enterprise, Brignoud, France

[21] Appl. No.: 463,230

[22] Filed: Jan. 11, 1990

[30] Foreign Application Priority Data

Jan. 11, 1989 [FR] France ................................ 89 00354

[51] Int. Cl.[5] ............................................ G06F 7/70

[52] U.S. Cl. ............................... 364/550; 364/424.04; 340/969; 360/6

[58] Field of Search ...................... 364/424.03, 424.04, 364/431.04, 431.12, 550, 551.01; 340/439, 521, 669-671, 902, 969; 324/113, 114; 73/116, 117.3; 360/5, 6

[56] References Cited

U.S. PATENT DOCUMENTS

| | | | |
|---|---|---|---|
| 4,181,943 | 1/1980 | Mercer, Sr. et al. | 364/426.05 |
| 4,188,618 | 2/1980 | Weisbart | 364/424.04 X |
| 4,400,783 | 8/1983 | Locke, Jr. et al. | 324/113 X |
| 4,561,057 | 12/1985 | Haley, Jr. et al. | 364/424.04 X |
| 4,608,638 | 8/1986 | Tsikos | 364/424.04 |
| 4,644,368 | 2/1987 | Mutz | 364/424.04 X |
| 4,646,241 | 2/1987 | Ratchford et al. | 360/5 X |
| 4,729,102 | 3/1988 | Miller, Jr. et al. | 360/5 X |
| 4,787,053 | 11/1988 | Moore | 360/5 X |
| 4,843,578 | 6/1989 | Wade | 364/565 |
| 4,853,859 | 8/1989 | Morita et al. | 364/424.03 X |
| 4,862,394 | 8/1989 | Thompson et al. | 360/5 X |
| 4,924,418 | 5/1990 | Bachman et al. | 364/550 |
| 4,939,652 | 7/1990 | Steiner | 364/424.04 |

*Primary Examiner*—Joseph L. Dixon

*Attorney, Agent, or Firm*—Lowe, Price, LeBlanc and Becker

[57] ABSTRACT

Performance of a helicopter is evaluated with an apparatus including a recorder section and a reader section interconnected during a start-up period while the pilot is initially operating the helicopter. The recorder includes two analog to digital converters connected across temperature and rotor torque sensors of the helicopter. The converters derive digital signals having values representing the amplitudes of analog signals derived by the sensors. The recorder section has a first logic network that couples the digital signals with a data collecting memory. The reader section includes a second logic network, a digital read-out device and manually activated coding wheels for deriving numeric representing digital signals. The first and second logic networks are programmed so that: (a) during the start-up period numeric representing digital signals derived from the coding wheels and corresponding with the values of readings of meters responsive to the sensors are coupled from the reader to the data memory, and (b) during operation of the helicopter, while the reader and recorder are not connected, digital signals from the converters having values commensurate with readings of the meters are supplied to the first logic network. The first logic network responds to the digital signals from the converters to store in the data memory digital values derived from the converters. After operation of the helicopter has been completed, and while the recorder and reader are interconnected, the first and second logic networks are interconnected so that the second logic network supplies to the digital read-out device numerical values commensurate with the relative values of the numeric representing digital signals derived during (a) and the digital signals derived and stored during (b).

16 Claims, 1 Drawing Sheet

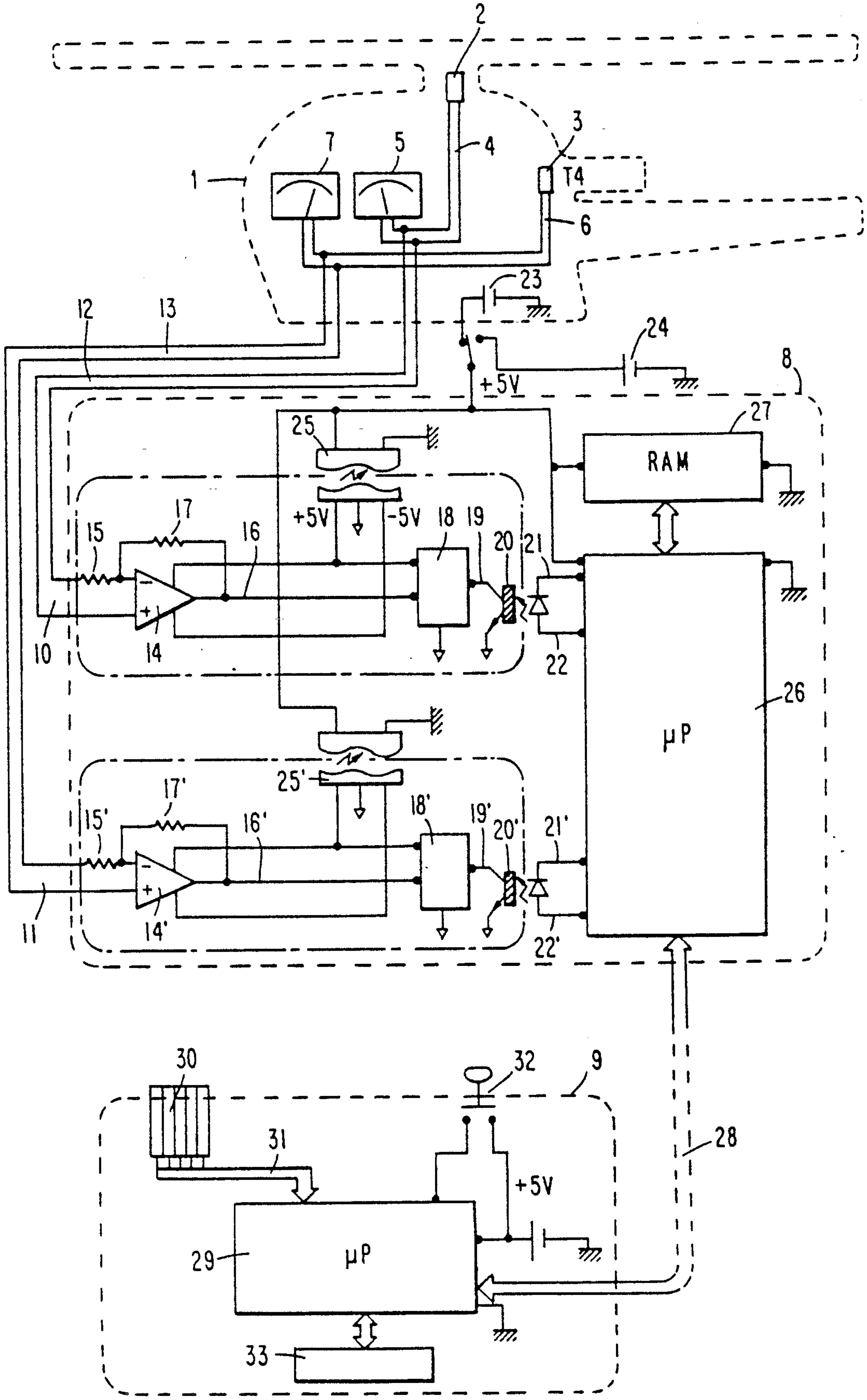
2
7
5
4
3
T4
1
6
23
12
13
24
8
+5V
25
27
RAM
17
16
+5V
-5V
18
19
20
21
15
10
14
22
26
μP
25'
17'
15'
16'
18'
19'
20'
21'
11
14'
22'
30
32
9
31
+5V
28
29
μP
33

METHOD FOR AND APPARATUS OF MONITORING HOW AN OPERATOR OPERATES A MACHINE

FIELD OF INVENTION

The present invention relates generally to an apparatus for and method of monitoring performance of an operator of a machine having a sensor for an operating parameter and a meter responsive to the sensor, and, more particularly, to such an apparatus and method wherein maximum desirable responses of the sensor to operation of the machine by the operator are programmed into a recorder during a start-up time.

BACKGROUND OF THE INVENTION

For certain purposes it is desirable to monitor performance of an operator of a machine having a sensor for at least one operating parameter and a meter responsive to the sensor for indicating the value of the parameter or parameters. For example, it may be desirable to measure the performance of an individual who rents a vehicle or other complex machine to be sure that the machine is not abused during rental.

It is for example possible to hire a helicopter without a pilot for occasional transport or handling use. The owner of the vehicle can only demand that the individual wishing to hire the vehicle show him a license for the type of vehicle to be rented. If the vehicle to be rented is very simple and rustic, relatively simple instructions will suffice to prevent improper operation. However, if the vehicle or other machine to be hired is more sophisticated, for example in the case of a helicopter, it has proven insufficient to trust the occasional pilot's ability. It is possible to operate a helicopter under abnormal conditions or beyond its allowed limits. Such operation will cause damage or wear of very expensive parts. The damage or abnormal wear is not always detectible when the complex machine is returned to the owner.

It is known to use a recording device mounted on a vehicle, which recording device permanently records useful information for subsequently determining the way the vehicle was piloted or operated. For example, trucks are equipped with clock motor driven disc recorders including a stylus for plotting truck speed as a function of time.

It is also known to use a more sophisticated recording device, employing a magnetic tape for recording digital or analog data representative of various vehicle parameters as well as other information such as pilot's calls. Those devices are usually called "black boxes".

All of these devices have some drawbacks that are described infra. First, they are always specific for the particular type of vehicle. On the other hand, it is either possible to fraudulently modify the recorded information, for example in the case of a rotating disc, or difficult to make full use of the information once the vehicle is returned, for example in the case of a "black box". The known devices designed for use with rented vehicles require, at the time the recorded information is read, decoding or analog or digital processing of the recorded data. This decoding is difficult, requires a specialist and does not deliver direct and actual evidence against the person who piloted and rented the vehicle. The pilot who hired the vehicle may, in such a situation, contest the parameters that the owner claims were read from the device and which indicate the operating manner of the vehicle.

There has been developed a "black box"-type device especially designed to be mounted on a helicopter and which does not use a magnetic tape recording system. The device comprises a digital data loading system in a memory logic circuit. This device indicates to the pilot, during a flight, any overrunning of a controlled parameter, with respect to a reference value, and is usually played back, after a flight, to read data recorded during the flight. The devices metering the operation are mounted on the helicopter so they are accessible to everybody, especially to the helicopter pilot. If, for example, the pilot is a person who has hired the helicopter for a short time period, it is not feasible to use such a device for the following reasons:

first, the helicopter owner is never sure that the pilot has not interfered with the operation of the device;

on the other hand, the pilot who has hired the helicopter cannot be assured that the values of the parameters recorded in the device represent the actual parameters read on the corresponding measuring instruments on the helicopter control panel.

A memory-type electronic circuit, while used as a data recording system, is basically the same as a magnetic tape recorder. The expected advantages are well known, resulting from the use of electronic circuits, especially integrated circuits, viz: reliability, no movable mechanical parts and therefore no wear.

To conclude, there is no previously developed device to detect the use of a general purpose transport means, permitting management of a depot of sophisticated vehicles, for example for renting purpose. In a commercial device of this type, it is necessary to combine reliability of the information collected in the device, invulnerability of stored data, ease of reading and interpretation of those data, with relative simplicity so that the device does not substantially increase operating expenses.

SUMMARY OF THE INVENTION

The aim of the invention is to overcome the above-mentioned drawbacks and to provide for particularly useful advantages, for example in the case of implementation in a depot of means of transport to be rented.

The invention therefore relates to a device for detecting the performance of an operator of a machine having sensors for operating parameters.

In accordance with one aspect of the present invention, the performance of an operator of a machine having a sensor for an operating parameter and a meter responsive to the sensor is monitored with an apparatus including a recorder section and a reader section. The recorder and reader sections are interconnected to each other during a start-up period while the operator is initially operating the machine. The recorder section includes means adapted to be connected across the sensor for deriving a digital signal having a value representing the amplitude of an analog signal derived by the sensor, a data collecting memory and a first logic network connected to be responsive to the derived digital signal and to couple digital signals with the memory. The reader section includes a second logic network, a digital readout device, such as a printer, and manually activated means for supplying numeric representing digital signals to the second logic network. The second logic network is connected to couple digital signals with the readout device.

The first and second logic networks are programmed so that: (a) during the start-up period a numeric representing digital signal derived from the manually activated means and corresponding with the value of a desired maximum reading of the meter is coupled from the reader to a memory, and (b) during operation of the machine, while the recorder and reader are not connected, digital signals from the converter having values commensurate with the readings of the meter are supplied to the first logic network. The first logic network responds to the digital signals from the converter to store digital values derived therefrom in the data memory. The first and second logic networks are also programmed so that after operation of the machine has been completed by the operator and while the recorder and reader are interconnected the first and second logic networks are interconnected so that the second logic network supplies digital signals to the digital readout device; these digital signals represent numeric values commensurate with the relative value of the numeric and the digital signals derived during (b).

The aforementioned method and apparatus thereby enable personnel reviewing the record produced by the digital readout means to determine the performance of the machine operator. If the relative values are, for example, represented by a ratio, a reading in excess of 1.00 provides a ready indication that the machine was operated in excess of its maximum value.

Typically, the same type of personnel who read the printout also set the maximum values during the start-up period. Because such personnel usually have considerable experience with the machine, they are able to determine easily and quickly what the maximum setting for the sensor reading should be during operation of the machine. Such a procedure and apparatus obviate the need for expensive and time-consuming calibration operations.

According to another aspect of the invention, the device comprises a first device, hereinafter called a "recorder", designed to be mounted on a vehicle to be rented. The recorder comprises a first programmable logic circuit, at least one analog-digital converter circuit having an input connected to a measuring instrument of an instrument panel of the vehicle and memory circuit for time to time recording the digital output signal of the converter circuit. A second device, hereinafter called "reader", to be kept by the vehicle owner, is adapted to be temporarily connected to the recording device. This reader comprises a second programmable logic circuit. The first and second programmable logic circuits are programmed to exchange binary signals through an electric connection coupling both devices so that, during each connection operation of the recorder and reader, the reader starts comparing a first permanently stored code in the recorder with a second permanently stored code in the reader. The reader authorizes a further exchange of signals with the recorder only if the first and second codes have a predetermined relation, e.g., they are identical. In such a case, the reader collects the value stored in the recorder memory circuit and transmits this value to an editing system designed to be read by the vehicle owner. The first and second programmable logic circuits are further programmed so that when the recorder and reader are connected and after the vehicle has been returned to the owner in order that the measuring instrument controlled by the device displays a non-null value, the second programmable logic circuit receives, through an appropriate control device, a digital value manually introduced into the control device by the vehicle owner. This value has a predetermined relation to the value indicated by the measuring instrument; the relation is preferably an identity. The first programmable logic circuit collects the digital value derived at the output of the converter circuit connected to the measuring instrument, calculates a coefficient corresponding to the relative values of the digital value generated by the control device and the digital value generated by the corresponding converter circuit, and permanently stores this coefficient so that, during subsequent connections of the reader and recorder, the first programmable logic circuit collects the stored value and multiplies it by the corresponding stored coefficient. The result is a value that is effectively transmitted to an editing system to be read by the vehicle owner.

It has been found that it is simple and very efficient to provide an assembly formed by two connectable devices, each including a programmable logic circuit, such as a microprocessor. One of the devices, designed to record the data of the operating vehicle, includes a microprocessor for managing data acquisition and for calibration of the devices for deriving the acquired data. The other device comprises a microprocessor for reading and marking the recorded data, once the vehicle is returned. The managed data are used mainly to verify whether the vehicle has been properly piloted and the way it has been used. These data can be used, for example, for determining renting rate.

According to another feature of the invention, the recorder comprises plural independent analog-digital converter circuits, each respectively connected to a different measuring instrument of the means of transport. The first programmable logic circuit independently calculates and stores the coefficient for each of the measuring instruments.

According to another feature of the invention, between each measuring instrument and the corresponding converter circuit, is connected to an electronic circuit for adapting the impedance or amplification of the electric signal derived from the measuring instrument. Each assembly formed by this electronic circuit and the corresponding converter circuit is fed by direct current from a direct-direct converter with galvanic isolation being provided between the inputs and outputs. The converter circuit is coupled to the first programmable logic circuit through electric connections, each comprising a component for galvanically isolating electric signals to be transmitted.

According to another feature of the invention, the control device for manually supplying a digital value corresponding to the value indicated by the measuring instrument comprises a set of manually activated coding wheels for deriving the digital value and a validation switch to be operated by the vehicle owner at the moment the owner notes that the corresponding measuring instrument is displaying the same value as indicated by the coding wheels. The coding wheels and the validation switch are connected to the second programmable logic circuit so that this circuit effectively considers the digital value derived by the detecting device and the digital value supplied at the output by the converter circuit at the very moment the validation switch is operated to cause the corresponding coefficient to be calculated.

According to another feature of the invention, the first programmable logic circuit is programmed to collect, at determined time intervals, digital values corresponding to one of the controlled measuring instruments and store those values and corresponding timetables supplied by a clock.

According to another feature of the invention, the first programmable logic circuit is programmed to collect, at determined time intervals, digital values corresponding to one of the measuring instruments and store only the detected maximum or minimum collected value.

According to another feature of the invention, when the device is used on a helicopter, the recorder comprises at least two coding circuits. One of the coding circuits is connected to a measuring instrument for rotor engine torque or the angle of the helicopter propeller blades. The other coding circuit is connected to a measuring instrument for nozzle exhaust gas temperature (temperature usually called T4). The first programmable logic circuit determines and stores the helicopter time schedule by comparing the value of the rotor engine torque with a predetermined value.

BRIEF DESCRIPTION OF THE DRAWING

The foregoing and other objects, features and advantages of the invention will be apparent from the following detailed description of a preferred embodiment as illustrated in the single figure of the accompanying drawing, a schematic diagram of a detecting device according to the invention.

DETAILED DESCRIPTION OF THE PREFERRED EMBODIMENT

Referring to the figure, helicopter 1, represented by dotted lines, includes sensor 2 for measuring rotor engine torque and sensor 3 for measuring temperature (T4) of exhaust gases from the propulsion engine nozzle. Sensor 2 is coupled by electric lead 4 to a rotor engine torque measuring instrument 5, mounted on the helicopter instrument panel. Sensor 2 includes a strain gauge while measuring instrument 5 includes a galvanometer having a needle for directly indicating torque value. Sensor 3 is coupled via electric leads 6 to the corresponding temperature monitor 7 mounted on the helicopter instrument panel. Sensor 3 includes a thermo-electric couple while monitor 7 includes a galvanometer, having a needle for directly indicating temperature value T4.

The device according to the invention includes recorder 8 and reader 9.

Recorder 8 comprises two sets of input terminals 10 and 11 respectively responsive to electric signals developed across the terminals of instruments 5 and 7; terminals 10 and 11 are respectively connected to the terminals of instruments 5 and 7 via electric leads 12 and 13. One of terminals 10 is connected to the inverting input (−) of DC operational amplifier 14 through resistor 15. The other input terminal 10 is connected to the non-inverting input (+) of amplifier 14. The inverting input (−) and output 16 of amplifier 14 are connected by feedback resistor 17. Amplifier 14 has a high impedance between its inverting and non-inverting input terminals relative to the impedance across leads 4 so that the amplifier does not draw appreciable current from instrument 5. The voltage gain of amplifier 14 is equal, in absolute value, to the ratio of resistor 17 to resistor 15. Output 16 is connected to the analog input of analog-digital converter 18, which derives a serial digital signal on output lead 19 which is connected to an opto-electronic component 20, known per se. Component 20 derives on leads 21, 22 a binary signal representing the digital value of the signal on output lead 19. The optical link of component 20 provides galvanic isolation between lead 19 and leads 21, 22. Recorder 8 is fed with direct current derived either by DC source 23 of helicopter 1 (while recorder 8 is connected to the latter) or by an independent battery 24 when the recorder is separated from the helicopter 1. The circuits of recorder 8 are at all times maintained in a powered condition by source 23 or battery 24 so that electronic semiconductor memories included therein are not erased. Power supply terminals for amplifier 14 and converter 18, at different DC levels from the memory, are responsive to source 23, DC to DC converter 25 (known per se), in turn responsive to the current of source 23 or 24. Hence, the power supply terminals of circuits 14 and 18 are galvanically isolated from the signals derived from these circuits.

Input 11, connected across the second measuring instrument 7, is coupled in the same way as input 10 to another set of electronic circuits having the same configuration as the circuitry connected to input 10. The various components connected to input 11, e.g., amplifier 14′, resistors 15, and 17′, DC to DC converter 25′ and analog-digital converter 18,′ respectively have the same reference numerals as the corresponding components connected to input 10, but differentiated by prime marks. Amplifier 14′ has a high input impedance relative to the impedance across leads 6 so that the amplifier does not draw appreciable current from instrument 7.

The voltage gains of amplifiers 14 and 14′ are easily adjusted by varying the values of resistors 15 and 15′. The values of resistors 15 and 15′ are changed in a predetermined way so that the outputs 16 and 16′ remain at proper levels for substantially different input voltages supplied to instruments 5 and 7. However, it is not necessary to perfectly adjust resistors 15 and 15′ to provide perfectly accurate calibration for the device.

The above described electronic components, corresponding in the figure to regions delineated by dot-and-dash lines, are galvanically isolated. Consequently, recorder 8 does not induce any parasitic current or voltage in instruments 5 and 7 and therefore does not modify the instrument indications, to ensure very high reliability.

Recorder 8 also comprises a first programmable logic circuit including microprocessor 26 responsive to the binary signals derived from components 20 and 20′. Microprocessor 26 derives a parallel binary output signal coupled via an appropriate bus to random access memory (RAM) 27. Circuits 26 and 27 are powered with current by electric sources 23 or 24.

The device according to the invention also comprises a reader 9, separated from recorder 8 but adapted to be connected with the latter via digital signal bus 28. Reader 9 comprises a second programmable logic circuit including microprocessor 29. Reader 9 further comprises a control device including a set of coding wheels 30, of a known type. Each of thumb wheels 30 has ten positions, at each of which is derived a signal representing the binary code of the numeric value associated with the thumb wheel position. The binary signals derived by the assembly of coding thumb wheels 30 is connected via digital signal bus 31 with microprocessor 29. Reader 9 also comprises validation switch 32 connected with microprocessor 29 and printer 33, which forms an editing system designed to be read by the helicopter owner.

Microprocessors 26 and 29 are programmed to carry out logic and arithmetic operations corresponding to the operating processes of recorder 8 and reader 9 such as hereinabove described in the paragraphs disclosing the various characteristics of the invention. RAM 27 stores the various recorded data that mainly comprise digital values resulting from coding of values measured by instruments 5 and 7. Associated with the coded values stored in RAM 27 are values representing the time schedules and dates of those measurements as well as coefficients corresponding to each instrument 5 and 7; these values are also stored in RAM 27.

Only the main electronic components comprising recorder 8 and reader 9 have been described. Recorder 8 and reader 9 include other circuits, known per se, permitting effective operation of the described circuits, especially for operation of microprocessors 26 and 29. For example, the system includes interface circuits connected between the microprocessors and the circuits to which they are connected, and possibly signal shaping circuits as well as at least one clock for synchronizing the transferred data, data buses, etc.

To better understand other improvements and advantages of the device according to the invention, a specific use of this device is now described. Consider a person (the owner) who owns, exploits or has on hand several helicopters. The owner derives benefit from his helicopters, partially or in the whole, by temporarily renting each helicopter to a customer (the occasional pilot) who will pilot it.

The owner permanently mounts a recorder 8 on each of his helicopters and has at least one reader 9. When the occasional pilot hires one of the helicopters, the owner initially connects reader 9 to helicopter recorder 8. Then, the owner gives the occasional pilot a few operating instructions and some operating parameters associated with readings of meters 5 and 7 that must not be exceeded. In the presence of the occasional pilot, the owner calibrates or recalibrates the specific parameter(s) that are monitored by recorder 8. To this end, the pilot starts operating the helicopter during a start-up period while reader 9 derives a value representing the specific parameter monitored by instrument 5 or 7 approaching a maximum authorized value. To this end, the owner adjusts coding wheels 33 of reader 9 to the maximum permissible values to be monitored by instruments or meters 5 and 7. When the meter exactly indicates the same value as the value displayed on reader 9, the owner validates the calibration by operating (closing) validation switch 32 in the presence of the occasional pilot. The binary signal derived from coding wheels 30 is coupled to memory 27 via microprocessor 29, bus 28 and microprocessor 26.

This process has the double advantage of assuring: that (1) the instructions to be followed by the occasional pilot are clearly understood and (2) the owner and the occasional pilot agree on the calibration of the device, as performed and stored according to the invention. The owner can further print, just after the calibration, the value read by recorder 8. This value is immediately displayed by printer 33 of reader 9. The pilot then verifies the accuracy of the measurement performed by the device. It will be further noted that this calibration process, which is one of the features of the invention, eliminates the need for very accurate and stable measurement systems, since (1) all system conversion errors of the electric signal are basically corrected by a coefficient resulting from the calibration process, and (2) this coefficient is stored as any unalterable binary digit.

Microprocessors 26 and 29 in recorder 8 and reader 9 prevent violability of the stored or transmitted data since the microprocessors are programmed to compare secret codes stored therein and which are accessed and compared each time the recorder and reader are connected. Recorder 8 and reader 9 exchange data only after the comparison indicates the stored secret codes are the same. It is possible to modify the program controlling said code, if, for example, the code or the verifying process of the code is learned by someone other than the owner.

The invention is not limited to the embodiment that has been hereinabove described but includes all possible variants. For example, the stored program for operating microprocessors 26 and 29 can perform other functions. Furthermore, other identification modes of the connected device using a secret code as well as a coding or scrambling system of the data exchanged between the recorder and reader can be devised. Other parameter acquisition modes can also be devised, for example by calculating, during data storing in RAM 27, the average value of a measured parameter during a period of time or the derived value of the measured parameter as a function of time.

I claim:

1. A device for use with a vehicle comprising a recorder to be mounted on the vehicle; said recorder including a first programmable logic circuit, an analog to digital converter having an input to be connected to a measuring instrument on an instrument panel of the vehicle, and a memory circuit for recording at determined periods of time a digital signal commensurate with the output value of the converter; and a reader to be kept by an owner of the vehicle and to be temporarily connected from time to time to the recorder, said reader including a second programmable logic circuit, manually activated digital signal source for deriving a digital value introduced by an owner of the vehicle, and a readout device; the first and second programmable logic circuits being programmed to exchange binary signals while the recorder and reader are connected so that each time the recorder and reader are connected, the reader logic circuit: (a) compares a first code stored in the recorder with a second code stored in the reader, (b) authorizes a further coupling of signals from the recorder to the reader in response to the compared first and second codes having a predetermined relation, (c) is activated to read a digital signal representing the value stored in the memory circuit of the recorder in response to the existence of the predetermined relation and (d) transmits a digital signal representing said stored signal to a read-out device of the reader to be read by the owner; the first and second programmable circuits being programmed so that, while the recorder and reader are connected with the vehicle in operation while the measuring instrument is deriving a non-zero value, the second programmable logic circuit responds to an introduced digital value derived from the manually activated digital signal source introduced by the owner of the vehicle, said introduced digital value being identical to a value indicated by the measuring instrument, the first logic circuit being programmed to respond to the digital signal value derived by the converter and to calculate a coefficient corresponding to the relative values of the introduced digital value generated by the digital signal source and the digital signal value derived by the converter for permanently storing said coefficient so that during subsequent connections of the recorder and reader, the first logic circuit responds to the stored value and multiplies it by said stored coefficient, the first and second logic circuits being programmed so the result is a signal having a value transmitted to the readout device to be read by the vehicle owner.

2. The device of claim 1 wherein said recorder comprises plural independent analog to digital converters, each being respectively connected to a different measuring instrument of the vehicle and wherein the first logic circuit calculates and independently stores each coefficient corresponding to each of the measuring instruments.

3. The device of claim 1 further including an electronic circuit having an impedance and amplification suitable for monitoring the response of the measuring instrument, said circuit being connected between the measuring instrument and the converter, said electronic circuit and said analog to digital converter being powered with direct current by a direct-direct converter so there is galvanic isolation between output and input terminals of the DC-DC converter, said converter circuit being coupled to the first logic circuit via a link, including a component for providing galvanic isolation between the analog to digital converter and the logic circuit.

4. The device of claim 1 wherein the manually activated digital signal source comprises a set of coding wheels for manually introducing the introduced digital value of the manually activated digital signal source and further including a validation switch to be operated by the owner at the very moment he notes that the measuring instrument indicates the same value as the one indicated by the coding wheels, the coding wheels and the validation switch being connected to the second logic circuit so that said second logic circuit effectively takes into account the digital value supplied by the coding wheels and the digital value derived by the analog to digital converter at the very moment the validation switch is operated, for calculating said corresponding coefficient.

5. The device of claim 1, wherein the first logic circuit is programmed so that it (a) collects at determined time intervals the digital values corresponding to an output of the measuring instrument, and (b) stores in memory said corresponding values and corresponding measuring time schedules derived by a clock.

6. The device of claim 1, wherein the first logic circuit is programmed so that it collects at determined time intervals the digital values derived from the analog to digital converter and corresponding to an output of the measuring instrument and stores only the maximum or minimum detected value.

7. The device of claim 1, wherein the device is designed to be used on helicopters, the recorder including at least two analog to digital converters, one of said analog to digital converters to be connected to a measuring instrument for indicating engine torque value of the helicopter rotor, and the other analog to digital converter being adapted to be connected to a measuring instrument for indicating the temperature of gases exhausting from the helicopter nozzle, the first programmable logic circuit being programmed to determine and store effective flight time of the helicopter by comparing the engine torque value of the rotor with a predetermined value.

8. Apparatus for monitoring how an operator operates a machine having a sensor for a variable value operating parameter and a meter responsive to the sensor, the sensor deriving an analog signal having an amplitude indicative of the variable value of the operating parameter, the meter including a display to be read by the operator and indicating the performance of the operator, the apparatus comprising:

a recorder section and a reader section, said sections to be interconnected during a start-up period while the operator is initially operating the machine;

the recorder section including: means to be connected across the sensor for deriving a digital signal having a value representing the amplitude of the analog signal derived by the sensor, a data collecting memory, and a first logic network, the first logic network being connected to be responsive to the digital signal having a value representing the amplitude of the analog signal derived by the sensor and to couple digital signals with the memory;

the reader section including a second logic network, a digital read-out device and manually activated means for supplying numeric representing digital signals to the second logic network, the second logic network being connected to couple digital signals with the read-out device;

the first and second logic networks being programmed so that: (a) during the start-up period a numeric representing digital signal derived from the manually activated means and corresponding with the value of a reading of the meter is coupled from the reader to a memory, and (b) during operation of the machine, while the reader and recorder are not connected, digital signals from the converter means having values commensurate with readings of the meter are supplied to the first logic network, the first logic network responding to the digital signals from the converter means to store in said data memory digital values derived from the converter means, and (c) after operation of the machine has been completed, and while the recorder and reader are interconnected, the first and second logic networks are interconnected so that the second logic network supplies to the digital read out device numerical values commensurate with the relative value of the numeric digital signals representing the digital signals derived and stored during machine operation (b).

9. The apparatus of claim 8 wherein the first and second logic networks are programmed so that (i) during start-up period (a) the numeric representing digital signal is stored in the data memory, (ii) the first logic network combines the numeric representing digital signal stored in the data memory during start-up period (a) with the digital signals derived from the converter during machine operation (b) to derive the digital signals representing numerical values commensurate with relative values of the numeric and the digital signals derived and stored during machine operation (b), and (iii) during (c) the digital signals derived during (ii) are coupled from the first logic network to the second logic network, thence to the digital read out device.

10. The apparatus of claim 9 wherein the first logic network is programmed so that (ii) occurs during machine operation (b) and the digital signals representing numerical values commensurate with the relative value of the numeric and the digital signals derived and stored during machine operation (b) are stored in the data memory during machine operation (b), and the signals stored during machine operation (b) are read from the data memory to the second logic network via the first logic network during (c).

11. The apparatus of claim 9 wherein the first and second logic networks are programmed so that the numerical values commensurate with the relative values represent the ratio of the numeric derived during start-up period (a) to the value of the digital signals derived during machine operation (b).

12. The apparatus of claim 8 wherein the first and second logic networks store coded digital signals, the first and second logic networks being programmed so that the coded digital signals in the first and second logic networks are compared during the start-up period prior to start up period (a), operations (a), (b) and (c) being enabled only in response to the compared coded signals having a predetermined relation to each other.

13. The apparatus of claim 12 wherein the first and second logic networks are programmed so that during (a) the coded digital signal stored in the second logic network is coupled to and compared in the first logic network with the coded digital signal stored in the first logic network.

14. The apparatus of claim 8 wherein the relative values are indicated by a ratio of the numeric derived during (a) and the digital signals derived during (b).

15. A method of monitoring how an operator operates a machine having a sensor for a variable value operating parameter and a meter responsive to the sensor, the sensor deriving an analog signal having an amplitude indicative of the variable value of the operating parameter, the method being performed with an apparatus including a recorder section and a reader section, the recorder section including means to be connected across the sensor for deriving a digital signal having a value representing the amplitude of the analog signal derived by the sensor, a data collecting memory, and a first logic network; the reader section including a second logic network, a digital readout device and manually activated means for supplying numeric representing digital signals to the second logic network; the method comprising the steps of:

activating said sections and said digital signal deriving means so the sections are interconnected during a start-up period while the operator is initially operating the machine and the means for deriving the digital signal is connected across the sensor, whereby during the start-up period the digital signal has a value representing the amplitude of the analog signal derived by the sensor;

during the start-up period: (i) coupling the digital signal having a value representing the amplitude of the analog signal derived by the sensor to the data collecting memory, (ii) connecting the second logic network with the manually activated means while the manually activated means supplies numeric representing digital signals to the second logic network, (iii) activating the manually activated means to a value commensurate with a maximum value being read on the meter, and (iv) coupling the numeric value representing the maximum value from the manually activated means from the reader to a memory;

activating the reader and recorder so the reader and recorder are disconnected during operation of the machine by the operator;

during operation of the machine by the operator, coupling digital signals having values commensurate with readings of the meter from the converter means to the data memory;

activating the recorder and reader so the second logic network is connected with the read-out device after operation of the machine has been completed so that the second logic network supplies to the read-out device digital signals representing values commensurate with the relative value of the numeric and the digital signals derived while the machine is being operated; and monitoring the relative values to determine how the operator operates the machine.

16. The method of claim 15 wherein the machine is a helicopter including first and second sensors for respectively monitoring engine torque of the helicopter rotor and temperature of exhaust gases from a nozzle of the helicopter, the engine torque of the rotor and the exhaust temperature being monitored and stored during each of (a) the start-up period, (b) during helicopter operation and subsequent to helicopter operation, the method further comprising comparing the values of the engine torque and temperature derived during operation with maximum values therefor as manually set during the start-up period.

* * * * *